(12) United States Patent
Singh et al.

(10) Patent No.: US 9,967,359 B2
(45) Date of Patent: May 8, 2018

(54) META-DATA BASED METHOD FOR LOCAL CACHE UTILIZATION

(71) Applicant: BLACKBERRY LIMITED, Waterloo (CA)

(72) Inventors: Ajit Singh, Waterloo (CA); Salmaan Ahmed, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 103 days.

(21) Appl. No.: 14/686,101

(22) Filed: Apr. 14, 2015

(65) Prior Publication Data

US 2015/0264151 A1    Sep. 17, 2015

Related U.S. Application Data

(63) Continuation of application No. 13/615,748, filed on Sep. 14, 2012, now abandoned, which is a
(Continued)

(51) Int. Cl.
*G06F 15/16* (2006.01)
*H04L 29/08* (2006.01)
(Continued)

(52) U.S. Cl.
CPC .... *H04L 67/2842* (2013.01); *G06F 17/30902* (2013.01); *H04L 29/06* (2013.01);
(Continued)

(58) Field of Classification Search
CPC .... H04L 67/42; H04L 67/2876; H04L 67/329
(Continued)

(56) References Cited

U.S. PATENT DOCUMENTS 5,859,971 A    1/1999  Bittinger et al.
5,867,661 A *  2/1999  Bittinger et al. ............. 709/227
(Continued)

OTHER PUBLICATIONS

Liao et al. "Architecture of Proxy Partial Caching using HTTP for supporting interactive video and cache consistency", Oct. 14, 2002.
(Continued)

*Primary Examiner* — Karen Tang
(74) *Attorney, Agent, or Firm* — Integral IP; Miriam Paton; Amy Scouten (57) ABSTRACT

Meta-data is generated by a client proxy based on previous response data received from a server proxy in response to a previous request for a resource. A client in communication with the client proxy makes a new request for the resource. The client proxy creates a modified request by modifying the new request to include one or more elements of the meta-data, and sends the modified request instead of the new request to the server proxy. The server proxy compares the one or more elements to corresponding one or more elements of meta-data stored in a server proxy cache. If all compared elements match, the server proxy instructs the client proxy to deliver response data stored in a client proxy cache to the client. If any of the compared elements does not match, the server proxy sends new response data to the client proxy for delivery to the client.

14 Claims, 6 Drawing Sheets

Related U.S. Application Data continuation of application No. 13/186,157, filed on Jul. 19, 2011, now Pat. No. 8,291,081, which is a continuation of application No. 11/017,931, filed on Dec. 22, 2004, now Pat. No. 8,010,670.

(60) Provisional application No. 60/531,615, filed on Dec. 23, 2003.

(51) Int. Cl.
*G06F 17/30* (2006.01)
*H04L 29/06* (2006.01)

(52) U.S. Cl.
CPC .......... *H04L 67/2852* (2013.01); *H04L 67/42* (2013.01); *H04L 67/2876* (2013.01); *H04L 69/329* (2013.01)

(58) Field of Classification Search
USPC .................................................. 709/224, 231
See application file for complete search history.

(56) References Cited

U.S. PATENT DOCUMENTS

| | | | |
|---|---|---|---|
| 5,878,213 A | 3/1999 | Bittinger et al. | |
| 5,931,904 A * | 8/1999 | Banga ............... | G06F 17/30899 341/55 |
| 6,085,193 A | 7/2000 | Malkin et al. | |
| 6,178,461 B1 | 1/2001 | Chan et al. | |
| 6,240,447 B1 | 5/2001 | Banga et al. | |
| 6,510,458 B1 | 1/2003 | Berstis et al. | |
| 6,553,409 B1 | 4/2003 | Zhang et al. | |
| 6,658,462 B1 | 12/2003 | Dutta | |
| 6,675,214 B2 | 1/2004 | Stewart et al. | |
| 6,751,608 B1 | 6/2004 | Cohen et al. | |
| 6,772,203 B1 | 8/2004 | Feiertag et al. | |
| 6,826,626 B1 | 11/2004 | McManus | |
| 6,883,068 B2 | 4/2005 | Tsirigotis et al. | |
| 6,907,501 B2 | 6/2005 | Tariq et al. | |
| 7,055,169 B2 | 6/2006 | Delpuch et al. | |
| 7,139,811 B2 | 11/2006 | Lev Ran et al. | |
| 7,191,290 B1 | 3/2007 | Ackaouy et al. | |
| 7,200,756 B2 | 4/2007 | Griffin et al. | |
| 7,243,122 B2 | 7/2007 | Acharya et al. | |
| 7,269,784 B1 | 9/2007 | Kasriel et al. | |
| 7,296,051 B1 | 11/2007 | Kasriel | |
| 7,305,473 B2 | 12/2007 | Vogt | |
| 7,334,023 B2 | 2/2008 | Koba et al. | |
| 7,349,929 B2 | 3/2008 | Pfitzner | |
| 7,376,790 B2 | 5/2008 | Lango et al. | |
| 7,480,731 B2 | 1/2009 | Seki et al. | |
| 7,487,261 B1 | 2/2009 | Kasriel | |
| 7,849,134 B2 | 12/2010 | McCanne et al. | |
| 7,864,186 B2 | 1/2011 | Robotham et al. | |
| 7,962,594 B2 | 6/2011 | Kasriel et al. | |
| 2002/0026511 A1 | 2/2002 | Garcia-Luna-Aceves et al. | |
| 2002/0026563 A1 | 2/2002 | Chamberlain et al. | |
| 2002/0055966 A1 | 5/2002 | Border et al. | |
| 2002/0194382 A1 | 12/2002 | Kausik et al. | |
| 2003/0028616 A1 * | 2/2003 | Aoki ....................... | H04L 47/10 709/217 |
| 2003/0115420 A1 | 6/2003 | Tsirigotis et al. | |
| 2003/0149737 A1 | 8/2003 | Lambert et al. | |
| 2003/0188009 A1 | 10/2003 | Agarwalla et al. | |
| 2003/0191812 A1 * | 10/2003 | Agarwalla ........ | G06F 17/30902 709/217 |
| 2003/0236857 A1 * | 12/2003 | Takase .............. | G06F 17/30902 709/217 |
| 2004/0003101 A1 * | 1/2004 | Roth ................. | H04L 29/06027 709/231 |
| 2005/0044242 A1 | 2/2005 | Stevens et al. | |
| 2005/0065999 A1 | 3/2005 | Acharya et al. | |
| 2006/0059223 A1 | 3/2006 | Klemets et al. | |
| 2006/0190607 A1 | 8/2006 | Lowery et al. | |
| 2006/0224752 A1 | 10/2006 | Parekh | |
| 2010/0241810 A1 | 9/2010 | Lowery et al. | |
| 2011/0320510 A1 | 12/2011 | O'Connell et al. | |
| 2012/0271905 A1 | 10/2012 | Issa | |
| 2013/0110906 A1 | 5/2013 | Zearing et al. | |

OTHER PUBLICATIONS

R. Fielding, J. Gettys, J. Mogul, H. Frystyk, L. Masinter, P. Leach, and T. Berners-Lee, "Request for Comments: 2616, Hypertext Transfer Protocol—HTTP/1.1," Network Working Group, Jun. 1999.

* cited by examiner

META-DATA BASED METHOD FOR LOCAL CACHE UTILIZATION

TECHNICAL FIELD

The present invention relates to a method (named Meta-Data Based Caching, or MDBC) of caching data locally by a client while using HTTP protocol for downloading data from a server in order to reduce the volume of data communication and also possibly reduce the data transmission time.

BACKGROUND

At present, large volumes of data are delivered over the Internet network to client computing devices such as desktop and laptop computers and various handheld digital devices using a communication protocol called, the Hyper Text Transfer Protocol (HTTP). The HTTP protocol can be visualized as a protocol for interaction between a HTTP client (or simply called client in this document) that sends requests for data, and a HTTP server (or simply called server in this document) that supplies the data. The client, after sending the request, waits for the server's response, and then normally, upon receipt of data, delivers the data to the end user. In many cases, the client is implemented by a software component called a web-browser. The server is usually implemented by a software component called a web-server. However, it is possible to use HTTP protocol by other types of software components to create a HTTP client or a HTTP server for exchange of data over the Internet. The client uses a text string called a Uniform Resource Locater (URL) to identify the data being requested by the client.

Since it is often the case that the data corresponding to a specific URL remains constant for some period of time, the HTTP protocol provides a mechanism for making use of the data previously accessed from the server which may be cached locally by a client. Such methods are described in R. Fielding, J. Gettys, J. Mogul, H Frystyk, L. Masinter, P. Leach, and T. Berners-Lee, "Request for Comments: 2616, Hypertext Transfer Protocol-HTTP/1.1," Network Working Group, June 1999 ("Fielding"), which is hereby incorporated by reference herein.

Generally, the primary benefits of caching data by the client are reduction in the volume of data transmitted by the server to the client, and reduction in the time required for accessing the data by the client. When a client locally stores or caches a copy of the data corresponding to a URL, the next time the same client requests the data for the same URL, the client's copy of the data corresponding to the URL is considered to be "fresh" or "stale" depending on whether the client's cached copy still contains the valid data or not. If the client's cache does contain a valid copy of the requested data, the client's copy is considered to be "fresh". On the other hand, if the client's cached copy no longer contains valid data corresponding to the URL, the client's copy is considered to be "stale. The HTTP protocol outlined in Fielding essentially relies on one of two metrics to determine if the copy of the content cached at the client is "stale" or "fresh":

A. The protocol can rely on the server that supplies data (called origin-server) to explicitly provide the expiration time and/or date for the data.

B. The client uses heuristics based on metrics specified by the HTTP protocol (such as the Last-Modified time) to estimate a plausible expiration time/date.

In Method A, the origin-server provides an explicit expiration time/date for the data corresponding to the URL. The client's caching mechanism maintains a database that maps each named data to its respective expiration time/date. Thus, each time the data is requested, the client's caching mechanism checks the database to see if the data is in the local cache of the client and if the expiration time/date has passed. If the expiration time/date has not passed then the request is fulfilled directly from the local cache and the origin server is not consulted. This technique or method is known as the "expiration" method of cache control.

Method B differs from Method A in that the origin-server does not explicitly specify an expiration time/date for each object, rather the caching mechanism associated with the client uses its own internal metrics to approximate an expiration date and time.

Method A is the preferred caching method, and also the more accurate of the two, but it is generally only effective as long as the server's expiration times are carefully chosen. Unfortunately, for a large and complex server with dynamic data, it is almost impossible to know a priori how much time will pass before a specific data will semantically change.

While Method B does not impose any requirements on server's administrators, it is not possible for this method to be perfectly accurate and, as a result, it may compromise semantic transparency.

In general, caching, as described in Fielding has two specific methods for reducing the volume of data transmission during the interaction between a client and a server:

I. Eliminate the need to send full requests, using an "expiration" mechanism ("Expiration Time Method").

II. Eliminate the need to send full responses, using a "validation" mechanism based on last-modified time ("Last-Modified Time Method").

As described earlier, Method I relies on the origin-server to supply an explicit expiration time/date for the data. According to this method, if the requested data is found in the local cache of the client, and it has not expired, the client need not send the request to the server.

On the other hand, for using the Method II, the origin-server need not provide an expiration date for the data. With Method II, the client's caching mechanism checks its database for a cached version of the requested data. If a cached version is found, then a request is sent to the origin-server to send the data if and only if the requested content has been modified since the time the client cached the data. If the content has not been modified, then the server only sends a response header and thereby instructs the client to use the cached copy. However, if the data has been modified since the last access, the server sends the new data.

Neither of Method I or Method II deals with a situation in which the data has been specified as not being suitable for caching by the server (or administrator thereof). In some situations, it may be simpler or more beneficial for a server to identify all data as not being suitable for caching so that there is no need to calculate/estimate an expiration time/date or other reason. As such, there is a need for a way to allow caching of many types of data, including that which is ordinarily indicated as "no cache".

SUMMARY

The system and method of the invention builds upon and is intended to improve upon the existing methods described above by providing additional methods for ascertaining the validity of cached data between a client and server, and thus reduce the volume of data transmission requirements. The method is based on utilizing computed characteristics, called meta-data, associated with the response data for a particular URL.

According to one embodiment of the invention, there is provided a system for caching data using a client-server model. The system includes: a) a client proxy and a server proxy in communication with each other and with the client and the server, respectively; b) a plurality of processors for calculating client proxy meta-data and server proxy meta-data related to the data cached by the client proxy and server proxy, respectively; and, c) a communication link for communicating said meta-data between the client proxy and the server proxy. At least one processor from the plurality of processors is further configured to compare the client proxy meta-data and the server proxy meta-data to determine a cache hit or miss.

According to another embodiment of the invention, there is provided a method for optimizing the transmission of data from a server to a client said method comprising the steps of: a) upon a client request for data to a client proxy, determining if a prior version of said data exists in a client proxy cache, if so forwarding a request containing client proxy meta-data describing said prior version of said data to a server proxy; b) if at step a) said prior version of said data does not exist in said client proxy cache, sending a request for said data to said server proxy; c) upon receipt of a request from step a) said server proxy determining if said prior version of said data is current based on comparing said client proxy meta-data with server proxy meta-data describing the data requested, if said prior version of said data is current, informing said client proxy of this, if not then fetching the current data from the said server, returning current data and updating server proxy meta-data; d) upon receipt of a request from step b) fetching current data from said server, updating server proxy meta-data, and sending said current data to said client proxy; e) updating said client proxy meta-data when said client proxy receives current data from said server proxy; and f) forwarding said prior version of said data or said current data from said client proxy to said client.

According to yet another embodiment of the invention, there is provided a method for ascertaining the validity of cached data on a HTTP client for a given URL using meta-data derived from response data previously fetched from the HTTP server for the same URL.

DETAILED DESCRIPTION

Figure 1:
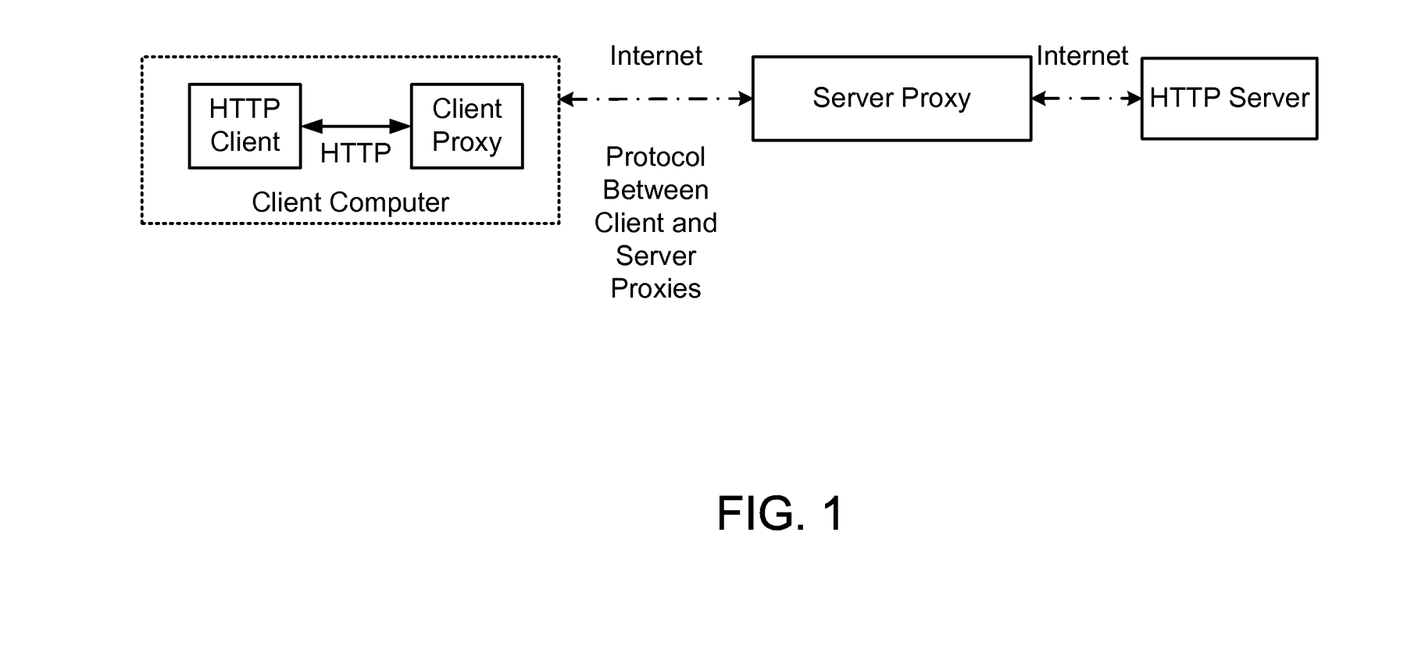
FIG. 1 shows the general structure of a meta-data based system for local cache utilization according to an embodiment of the invention.
Figure 2A:
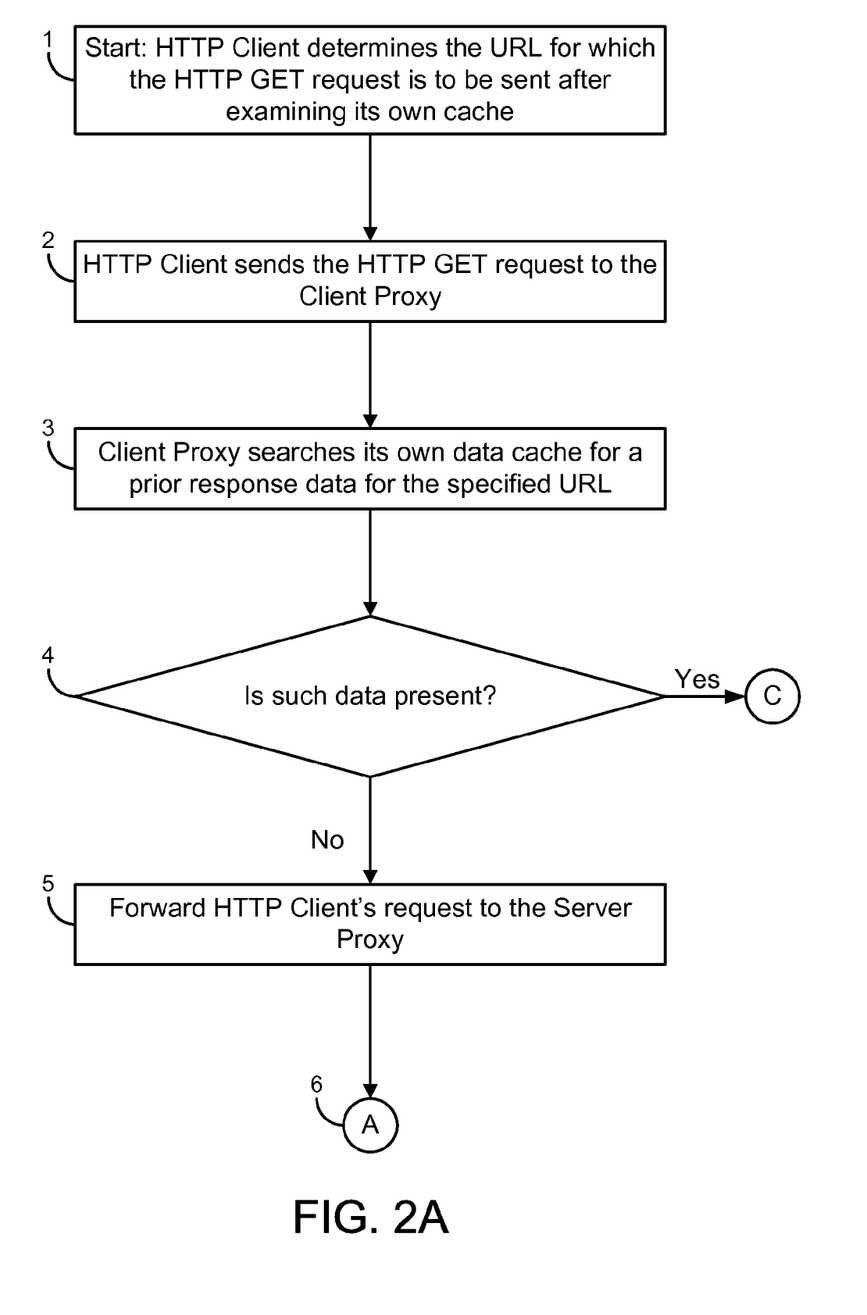
FIGS. 2A, 2B, 2C, 2D, 2E and 2F together show a flowchart of the operation of a meta-data based method for local cache utilization according to an embodiment of the invention.
Figure 2B:
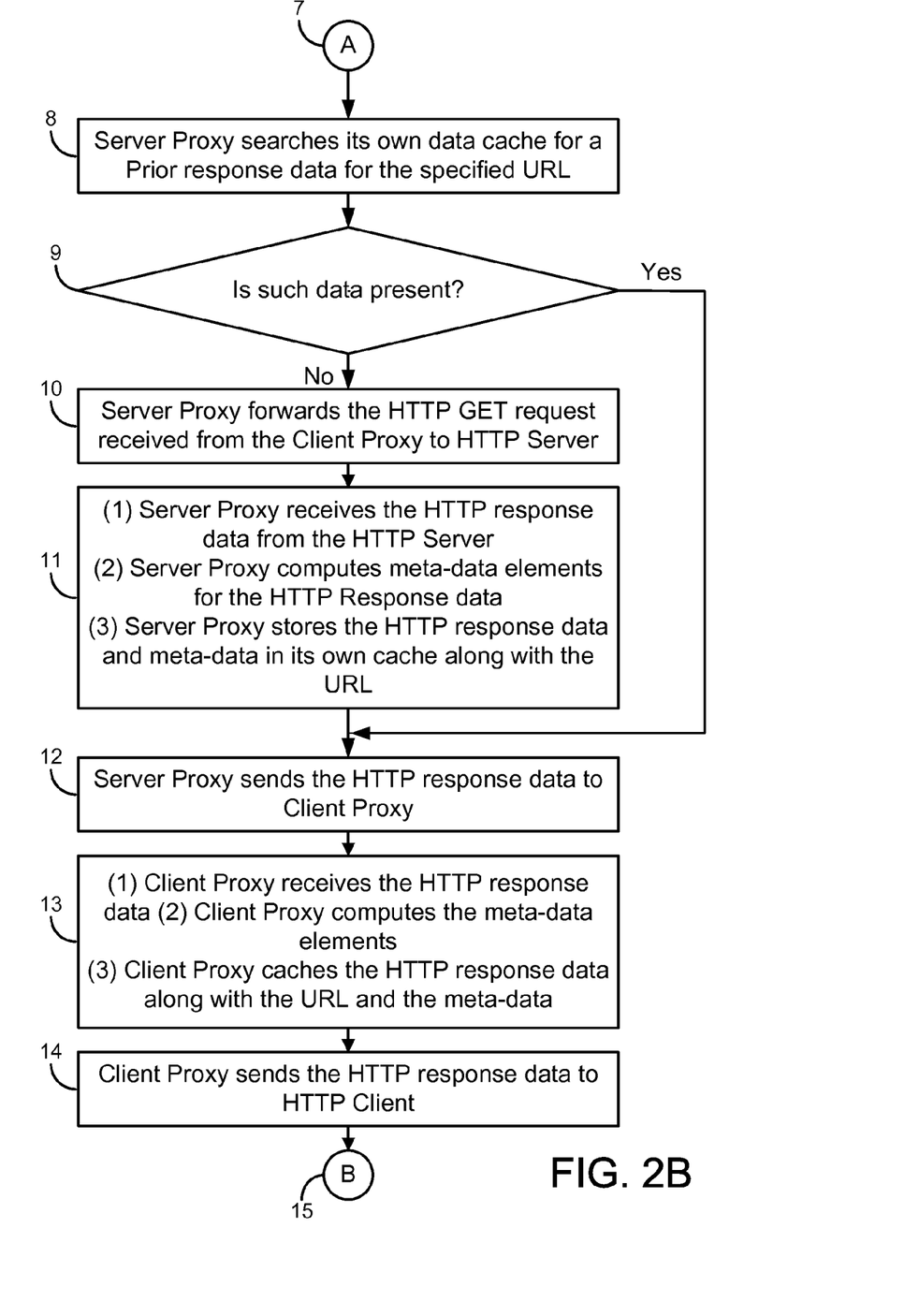
Figure 2C:
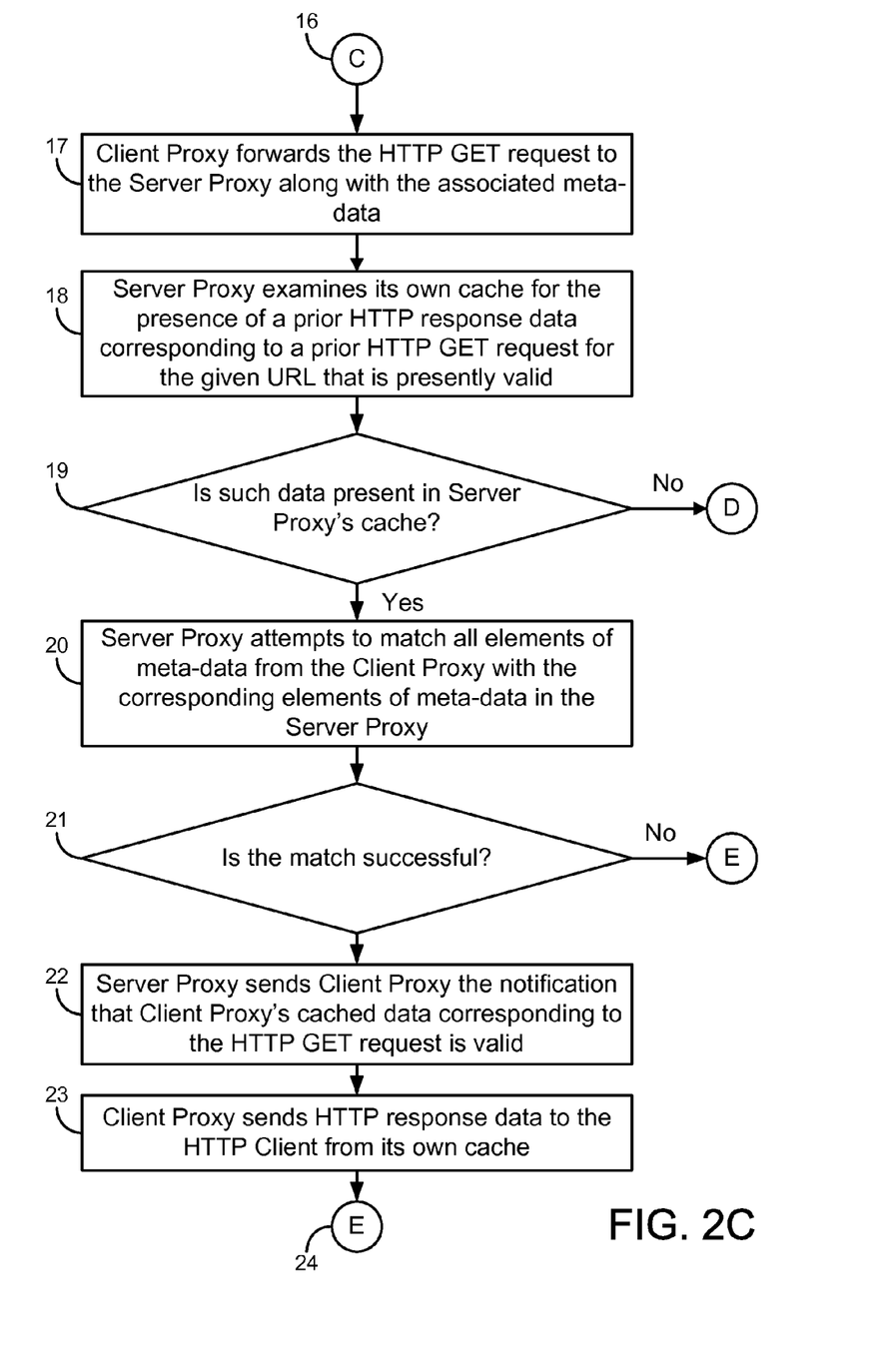
Figure 2D:
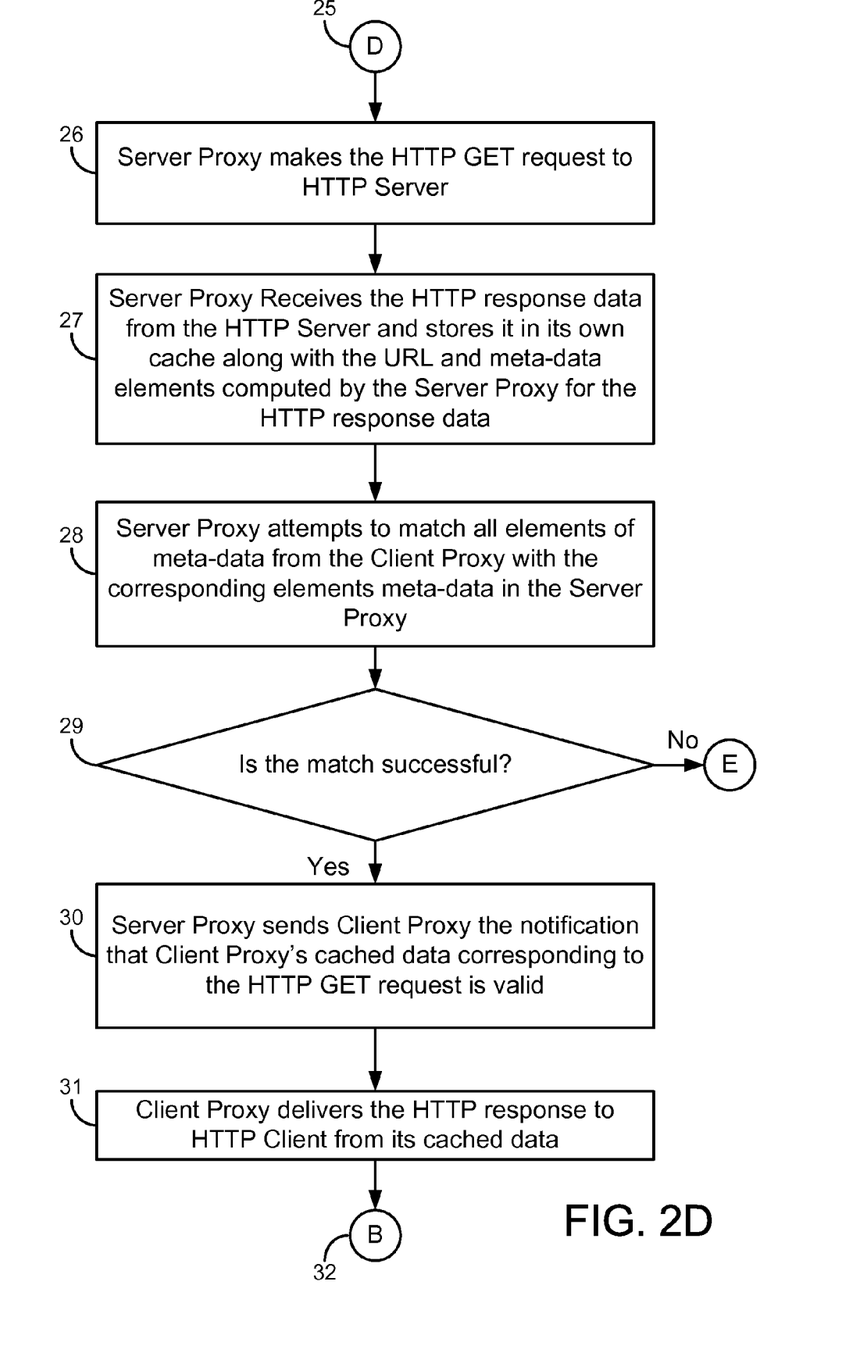
Figure 2E:
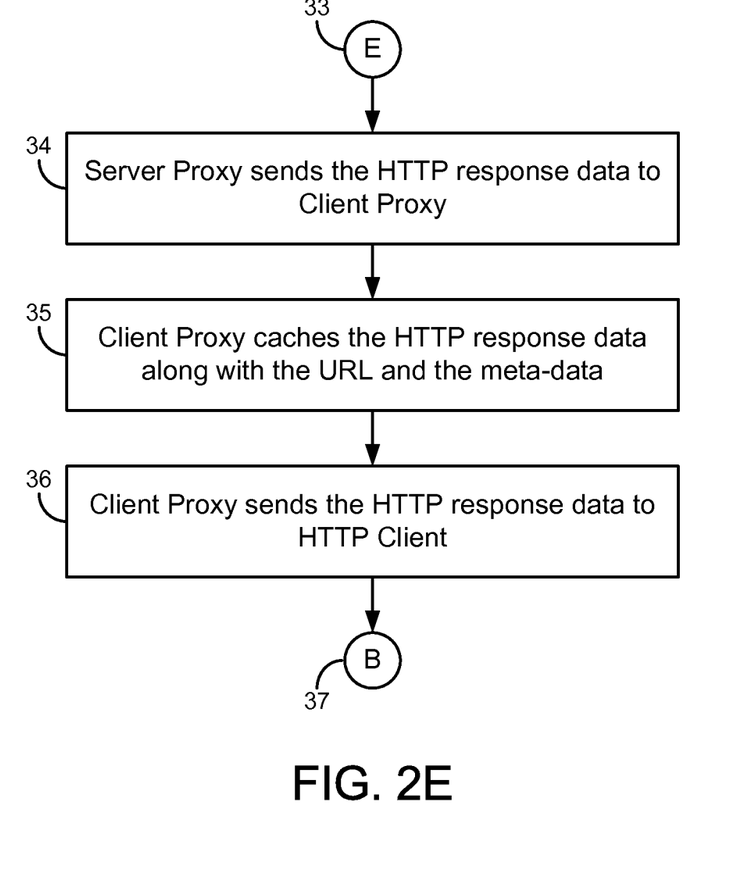
Figure 2F:
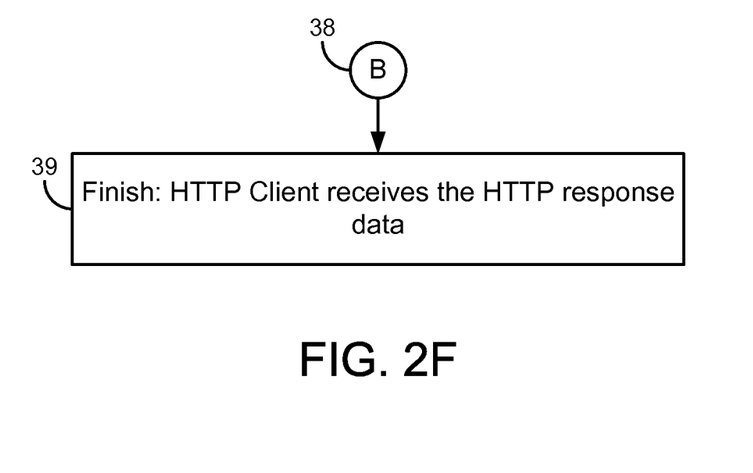

The software architecture for the MDBC method of interaction between a HTTP client and HTTP server is shown in FIG. 1.

In FIG. 1, the client computer is connected to the Internet using any type of link (low or high bandwidth). HTTP Client in FIG. 1 represents any HTTP client that requests data from a server using the HTTP protocol. HTTP Server component in FIG. 1 represents any HTTP server that supplies data to requesting clients. HTTP Client on the client computer does not directly interact with HTTP Server. Rather, two intermediate software components are used—one on the client side, and the other on the server side. The client side component is called Client Proxy. The server side component is called Server Proxy. A Server Proxy can concurrently interact with (or serve) multiple Client Proxy components located on different client computers. Instead of sending its HTTP request for data directly to HTTP Server, HTTP Client sends the data request to Client Proxy. Client Proxy, as described later, may modify the original request from HTTP Client and then sends the request to Server Proxy. Depending upon the situation, as described later, Server Proxy first attempts to respond to Client Proxy's request using its own cached data, failing which it may send the request to HTTP Server. Similarly, an HTTP response from HTTP Server is communicated through the Server Proxy and then to Client Proxy, before being delivered to HTTP Client. Optionally, all the data that is communicated between Client Proxy and Server Proxy can be optimized using a customized protocol between Client Proxy and Server Proxy by using optimization techniques, including but not limited to, data compression techniques.

Based on the software architecture shown in FIG. 1, the caching techniques outlined in Fielding are improved using the algorithm described as follows:

Prior to sending a HTTP request for data, HTTP Client may optionally search its own cache and then determine if a valid copy of the required data is present in its own cache or whether a HTTP request for a given URL needs to be sent.

Next, for each data being requested, HTTP Client sends Client Proxy a request of the following form:

GET <URL> PROTOCOL VERSION

For instance:

GET http://www.w3.org/HTTP/1.1

Both Client Proxy and Server Proxy maintain their respective databases that hold, for a certain period of time, additional information about each HTTP response data corresponding to a URL that has previously been received along with the actual response data. This additional information is called meta-data associated with the response data. This meta-data includes, but is not limited to, the URL associated with the response data, (more generally, the meta-data can be indexed or keyed to the requested URL) the type of data in the response data (for example, a text file, or a GIF image file), the length of the response data, a hash value associated with the response data. The hash value could be computed using CRC-16, CRC-32, SHA1, MD2, MD4, MD5, or any other suitable algorithm. By design, Client Proxy and Server Proxy are coordinated with respect to the meta-data elements used in a particular implementation of MDBC method and algorithms used for computing each such meta-data element.

In a case in which no prior response data is found in Client Proxy cache for the given URL, the Client Proxy simply forwards HTTP Client's request to Server Proxy. Server Proxy first searches its own data cache for the response data for the URL specified by the Client Proxy that is currently valid based on either Expiration Time Method or the Last-Modified Time Method. If such data is found, Server Proxy returns the response data to the Client Proxy. Otherwise, Server Proxy interacts as a regular HTTP client with HTTP Server as described in Fielding and receives the response data from the HTTP Server. Server Proxy sends the response data to Client Proxy. In either case, the Client Proxy, in turn, sends the response data to HTTP Client. Both Client Proxy and Server Proxy cache the response data along with the meta-data in their respective databases for their future use.

In a case in which, a prior response corresponding to the requested URL is found in Client Proxy's cache, Client Proxy, as part of a modified request, forwards to Server Proxy elements of the meta-data associated with the prior response data for that specific URL.

Server Proxy, upon receiving the request from the Client Proxy, first attempts to fulfill the request from the Client Proxy by examining its own cache. If a prior response data for the particular URL is found in Server Proxy's cache, which is still valid based on either the Expiration Time Method or the Last-Modified Time Method, then Server Proxy retrieves the meta-data for the response data from its cache and compares each element of the received meta-data with the corresponding values of meta-data supplied by Client Proxy. If the values for all the corresponding elements of meta-data match, then the Server Proxy informs the Client Proxy to deliver to HTTP Client the response data that is stored in the Client Proxy's cache. The actual response body is not transmitted from the Server Proxy to Client Proxy. Client Proxy delivers the HTTP response data from the Client Proxy's cache to the HTTP client.

If, on the other hand, Server Proxy does not find a valid prior response data for the particular URL in its cache and Server Proxy acts as a HTTP client to the HTTP Server and sends a regular HTTP request based on the protocol described in Fielding to HTTP Server. HTTP Server sends the HTTP response data to Server Proxy. On receiving response data from HTTP Server, Server Proxy computes the meta-data for the newly received response data from HTTP Server, using the same algorithm as was used by the Client Proxy, and compares each element of the newly computed meta-data with the corresponding values of meta-data supplied by Client Proxy. If the values for all the corresponding elements of meta-data match, then the Server Proxy informs the Client Proxy to deliver to the HTTP Client the data that is stored in the Client Proxy's cache. The actual response body is not transmitted from the Server Proxy to Client Proxy. Server Proxy stores the response data along with the associated URL and meta-data in its own cache.

Finally, if Server Proxy, on receiving the requested response data either from its own cache or from HTTP Server, computes the meta-data for the newly received response data, and any element of the newly computed meta-data does not match with the corresponding element of the meta-data supplied by the Client Proxy, the cached copy of the response data, stored in Client Proxy's cache, is considered invalid. In this case, Server Proxy sends the newly received response data to the Client Proxy. Client Proxy then sends the response data to HTTP Client. Both Client Proxy and Server Proxy cache the new response data in their respective databases along with the associated URL and meta-data for their future use.

This method may result in a significant reduction in the volume of data transmission from Server Proxy to Client Proxy, and therefore, it may also reduce the time elapsed from the time the request was generated by the HTTP Client and the time the response is delivered to the HTTP Client. It is particularly beneficial when Client Proxy and Server Proxy are connected over a low bandwidth link.

The caching method according to embodiments of the invention coexists with those techniques described in Fielding, but also handles cases the techniques in Fielding may miss. For instance, even data marked as "Cache-Control: private" or "Cache Control: no-cache" (indicating that the data should not be cached) can be safely cached using the MDBC method according to embodiments of the invention.

Also, the meta-data can be used to supplement the methods in Fielding as additional or independent metrics for ascertaining whether a cached copy of response data is valid or not.

Furthermore, so long as a suitable meta-data is used, the HTTP Client can achieve a high degree of certainty in receiving the requested data that is correct, and not "stale".

EXAMPLE

As an example, a situation is illustrated here where Client Proxy uses the length of the response data and a computed hash value as two elements of the meta-data (in addition to the URL string itself) associated with a response data for a URL. For each data being requested, HTTP Client sends Client Proxy a request of the following form:
GET <URL> PROTOCOL VERSION
For instance:
GET http://www.w3.org/HTTP/1.1

In a case in which no prior response data is found in Client Proxy cache for the given URL, the Client Proxy simply forwards HTTP Client's request to Server Proxy. Server Proxy first searches its own data cache for the response data for the URL specified by the Client Proxy that is currently valid based on either the Expiration Time Method or Last-Modified Time Method. If such data is found, Proxy Server returns the response data to the Client Proxy. Otherwise, Server Proxy interacts as a regular HTTP client with HTTP Server as described in Fielding and receives the response data from the HTTP Server. Server Proxy sends the response data to Client Proxy. In either case, Client Proxy, in turn, sends the response data to HTTP Client. Both Client Proxy and Server Proxy cache the response data, along with the URL string, length and hash value, in their respective databases for their future use.

In the case where a prior response corresponding to the requested URL is found in Client Proxy's cache, Client Proxy, as part of a modified request, forwards to Server Proxy the request for the URL along with the length and the hash value of the last response data it received for that specific URL.

Server Proxy, upon receiving the request from the Client Proxy, first attempts to fulfill the request from the Client Proxy by examining its own cache. If a prior response data for the particular URL is found in Server Proxy's cache, which is still valid based on either Expiration Time Method or Last-Modified Time Method, then Server Proxy computes the length and hash value for the response data from its cache, using the same algorithm as was used by the Client Proxy, and compares new length and hash value with the length and hash value respectively supplied by Client Proxy. If the length and hash values both match, Server Proxy informs Client Proxy to deliver HTTP Client the response data that is stored in Client Proxy's cache. The actual body of response data is not transmitted from the Server Proxy to Client Proxy. Client Proxy delivers the HTTP response data from the Client Proxy's cache to the HTTP Client.

If, on the other hand, Server Proxy does not find a valid prior response data for the particular URL in its cache then Server Proxy acts as a HTTP client to the HTTP Server and sends a regular HTTP request based on the protocol described in Fielding to HTTP Server. HTTP Server sends the HTTP response data to Server Proxy. On receiving response data from the HTTP Server, Server Proxy computes the length and hash value for the newly received response data from HTTP Server, using the same algorithm as was used by Client Proxy, and compares the newly computed length and hash value with the values of length and hash value respectively, supplied by Client Proxy. If the length and hash value match with the length and hash value supplied by the Client Proxy, then the Server Proxy informs the Client Proxy to deliver to the HTTP Client the data that is stored in the Client Proxy's cache. The actual response body is not transmitted from the Server Proxy to Client Proxy. Server Proxy stores the response data along with the associated URL and meta-data in its own data cache.

Finally, if Server Proxy, on receiving the requested response data either from its own cache or from HTTP Server, computes the length and hash value for the newly received response data, and either newly computed length or hash value does not match with the corresponding length and hash value supplied by the Client Proxy, the cached copy of the response data, stored in Client Proxy's cache, is considered invalid. In this case, Server Proxy sends the newly received response data to the Client Proxy. Client Proxy then sends the response data to HTTP Client. Both Client Proxy and Server Proxy cache the new response data in their respective databases along with the associated URL and meta-data for their future use.

Other embodiments of the MDBC method are possible based on placement of software functionality for HTTP Client, Client Proxy, Server Proxy and HTTP Server components described above. These alternate embodiments are briefly described here.

1. HTTP Client and the Client Proxy can be located on different computers. A single Client Proxy, in this case, can serve one or more HTTP Clients located on different computers.
2. The functionality of the HTTP Client and Client Proxy can be combined in a single software component. For example, a web-browser can implement the combined functionality of HTTP Client and Client Proxy.
3. Server Proxy and HTTP Server may be located on the same computer.
4. The functionality of Server Proxy and Server can be combined into a single software component.
5. The MDBC method is also applicable and can be extended to other name/value-based protocols such as the file transfer protocol (FTP).

It should be recognized that the embodiments described herein and shown in the drawing figures are meant to be illustrative only and should not be taken as limiting the scope of invention. Those skilled in the art will recognize that the elements of the illustrated embodiments can be modified in arrangement and detail without departing from the spirit of the invention. Therefore, the invention as described herein contemplates all such embodiments and modified embodiments as may come within the scope of the following claims or equivalents thereof.

What is claimed is:

1. A method to be performed by a client proxy in communication with a client, the method comprising:
   receiving previous response data from a server proxy in communication with a server, the previous response data sent to the client proxy by the server proxy in response to a previous request for a resource, wherein the previous response data is indicated as unsuitable for caching such that there is no need to determine an expiration time or date of the previous response data;
   generating previous client proxy meta-data based on the previous response data, and storing the previous client proxy meta-data and the previous response data in a client proxy cache;
   responsive to receiving a new request for the resource from the client and determining that the previous response data is stored in the client proxy cache, always creating a modified request by modifying the new request to include one or more elements of the previous client proxy meta-data and sending the modified request instead of the new request to the server proxy;
   in the event that all of the one or more elements of the previous client proxy meta-data included in the modified request match server proxy meta-data computed from a server proxy version of the previous response data, receiving an instruction from the server proxy to deliver the previous response data stored in the client proxy cache to the client; and
   in the event that any of the one or more elements of the previous client proxy meta-data included in the modified request do not match the server proxy meta-data computed from the server proxy version of the previous response data, receiving new response data from the server proxy.

2. The method as recited in claim 1, further comprising:
   responsive to receiving the instruction, delivering the previous response data stored in the client proxy cache to the client.

3. The method as recited in claim 1, further comprising:
   responsive to receiving the new response data,
   delivering the new response data to the client.

4. The method as recited in claim 1, wherein generating the previous client proxy meta-data comprises computing a length of the previous response data.

5. The method as recited in claim 1, wherein generating the previous client proxy meta-data comprises computing a hash value of the previous response data.

6. The method as recited in claim 1, wherein the previous client proxy meta-data comprises an identifier of the resource.

7. The method as recited in claim 1, wherein the previous client proxy meta-data comprises an indication of a type of data in the previous response data.

8. A non-transitory computer-readable medium storing instructions which, when executed by a processor to implement a client proxy, result in:
   receiving previous response data from a server proxy in communication with a server, the previous response data sent to the client proxy by the server proxy in response to a previous request for a resource; wherein the previous response data is indicated as unsuitable for caching such that there is no need to determine an expiration time or date of the previous response data;
   generating previous client proxy meta-data based on the previous response data, and storing the previous client proxy meta-data and the previous response data in a client proxy cache;
   responsive to receiving a new request for the resource from a client in communication with the client proxy and determining that the previous response data is stored in the client proxy cache, always creating a modified request by modifying the new request to include one or more elements of the previous client proxy meta-data and sending the modified request instead of the new request to the server proxy;
   in the event that all of the one or more elements of the previous client proxy meta-data included in the modified request match server proxy meta-data computed from a server proxy version of the previous response data, receiving an instruction from the server proxy to deliver the previous response data stored in the client proxy cache to the client; and in the event that any of the one or more elements of the previous client proxy meta-data included in the modified request do not match the server proxy meta-data computed from the server proxy version of the previous response data, receiving new response data from the server proxy.

9. The non-transitory computer-readable medium as recited in claim 8, wherein the instructions, when executed by the processor, further result in:
responsive to receiving the instruction, delivering the previous response data stored in the client proxy cache to the client.

10. The non-transitory computer-readable medium as recited in claim 8, wherein the instructions, when executed by the processor, further result in:
responsive to receiving the new response data, delivering the new response data to the client.

11. The non-transitory computer-readable medium as recited in claim 8, wherein generating the previous client proxy meta-data comprises computing a length of the previous response data.

12. The non-transitory computer-readable medium as recited in claim 8, wherein generating the previous client proxy meta-data comprises computing a hash value of the previous response data.

13. The non-transitory computer-readable medium as recited in claim 8, wherein the previous client proxy meta-data comprises an identifier of the resource.

14. The non-transitory computer-readable medium as recited in claim 8, wherein the previous client proxy meta-data comprises an indication of a type of data in the previous response data.

\* \* \* \* \*